US012576427B2

(12) United States Patent
Phillips et al.

(10) Patent No.: US 12,576,427 B2
(45) Date of Patent: Mar. 17, 2026

(54) APPARATUS AND METHODS USING COATINGS FOR METAL APPLICATIONS

(71) Applicant: G3 Enterprises, Inc., Modesto, CA (US)

(72) Inventors: Michael Phillips, Modesto, CA (US); John Cunningham, Tracy, CA (US)

(73) Assignee: G3 Enterprises, Inc., Modesto, CA (US)

( * ) Notice: Subject to any disclaimer, the term of this patent is extended or adjusted under 35 U.S.C. 154(b) by 345 days.

(21) Appl. No.: 18/311,689

(22) Filed: May 3, 2023

(65) Prior Publication Data

US 2023/0271219 A1 Aug. 31, 2023

Related U.S. Application Data

(63) Continuation of application No. 16/689,883, filed on Nov. 20, 2019, now Pat. No. 11,707,763.

(60) Provisional application No. 62/770,006, filed on Nov. 20, 2018.

(51) Int. Cl.
| | |
|---|---|
| *B05D 3/06* | (2006.01) |
| *B05D 1/28* | (2006.01) |
| *B05D 5/04* | (2006.01) |
| *B05D 7/14* | (2006.01) |
| *B41F 5/24* | (2006.01) |
| *B41N 1/04* | (2006.01) |
| *C08F 20/28* | (2006.01) |
| *C08G 59/24* | (2006.01) |
| *C08G 65/00* | (2006.01) |
| *C09D 4/06* | (2006.01) |
| *C09D 11/101* | (2014.01) |
| *C09D 129/10* | (2006.01) |
| *B05D 7/00* | (2006.01) |
| *C08G 64/02* | (2006.01) |

(52) U.S. Cl.
CPC .............. *B05D 3/067* (2013.01); *B05D 1/28* (2013.01); *B05D 5/04* (2013.01); *B05D 7/14* (2013.01); *B41F 5/24* (2013.01); *B41N 1/04* (2013.01); *C08F 20/28* (2013.01); *C08G 59/24* (2013.01); *C08G 65/002* (2013.01); *C09D 4/06* (2013.01); *C09D 11/101* (2013.01); *C09D 129/10* (2013.01); *B05D 7/536* (2013.01); *B05D 2202/25* (2013.01); *B05D 2504/00* (2013.01); *B05D 2701/10* (2013.01); *C08G 64/0208* (2013.01); *C08G 2270/00* (2013.01); *Y10T 428/24876* (2015.01); *Y10T 428/24901* (2015.01); *Y10T 428/24917* (2015.01); *Y10T 428/31529* (2015.04)

(58) Field of Classification Search
CPC ..................................................... B05D 3/067
See application file for complete search history.

(56) References Cited

U.S. PATENT DOCUMENTS

| | | | |
|---|---|---|---|
| 3,738,991 | A | 6/1973 | Reed |
| 4,003,868 | A | 1/1977 | Smith et al. |
| 4,156,035 | A | 5/1979 | Tsao et al. |
| 4,221,892 | A | 9/1980 | Baron et al. |
| 4,997,900 | A | 3/1991 | Brinkman |
| 5,098,751 | A | 3/1992 | Tamura et al. |
| 5,141,646 | A | 8/1992 | Rozich |
| 5,162,392 | A | 11/1992 | Wool et al. |
| 5,206,279 | A | 4/1993 | Rowland et al. |
| 5,234,150 | A | 8/1993 | Yamamoto et al. |
| 5,255,805 | A | 10/1993 | Weiss et al. |
| 5,318,850 | A | 6/1994 | Pickett et al. |
| 5,387,635 | A | 2/1995 | Rowland et al. |
| 5,631,307 | A | 5/1997 | Tanaka et al. |
| 5,672,675 | A | 9/1997 | Green et al. |
| 5,700,529 | A | 12/1997 | Kobayashi et al. |
| 5,759,703 | A | 6/1998 | Neymark et al. |
| 5,776,604 | A | 7/1998 | Lu et al. |
| 6,150,470 | A | 11/2000 | Sullivan |
| 6,180,200 | B1 | 1/2001 | Ha et al. |
| 6,852,792 | B1 | 2/2005 | Capendale et al. |
| 2002/0082524 | A1 | 6/2002 | Anderson et al. |
| 2003/0118737 | A1 | 6/2003 | Valeri et al. |
| 2003/0127415 | A1 | 7/2003 | Carballido |
| 2004/0024078 | A1 | 2/2004 | Itoh et al. |
| 2004/0067304 | A1 | 4/2004 | Daly et al. |
| 2005/0074623 | A1 | 4/2005 | Vogel |

(Continued)

FOREIGN PATENT DOCUMENTS

| | | |
|---|---|---|
| CN | 107987474 A | 5/2018 |
| DE | 3523860 A1 | 1/1987 |

(Continued)

OTHER PUBLICATIONS

Crivello, The Discovery and Development of Onium Salt Cationic Photoinitiators, Journal of Polymer Science: Part A: Polymer Chemistry, vol. 37, 4241-4254, 1999 (Year: 1999).*
International Search Report and Written Opinion for International Patent Application No. PCT/US2019/062491, dated Mar. 19, 2020 (15 pages).
Charles E. Hoyle, "Photocurable Coatings," Radiation Curing of Polymeric Materials, American Chemical Society, Dec. 28, 1990, 147:1-16.
Dow Brochure "Preparation of Aqueous Dispersions of PRIMACOR Copolymers" Printed Oct. 2012, 8 pages.

(Continued)

*Primary Examiner* — Tabatha L Penny

(74) *Attorney, Agent, or Firm* — Dentons US LLP

(57) ABSTRACT

A method includes obtaining a metal substrate coated with a polymeric film which includes a first polymer obtained using a cationic photoinitiator and a second polymer obtained using a free-radical photoinitiator. The method further includes deep drawing the metal substrate and the polymeric film while the polymeric film is in a first crosslink density state and curing the deep-drawn polymeric film to achieve a second crosslink density state.

15 Claims, 5 Drawing Sheets

(56)        References Cited

U.S. PATENT DOCUMENTS

| | | | |
|---|---|---|---|
| 2005/0164008 A1 | 7/2005 | Rukavina | |
| 2006/0063911 A1 | 3/2006 | Cayton et al. | |
| 2006/0111488 A1 | 5/2006 | Zhang et al. | |
| 2007/0042142 A1 | 2/2007 | O'Brien et al. | |
| 2007/0117916 A1 | 5/2007 | Anderson et al. | |
| 2007/0267134 A1 | 11/2007 | Konarski et al. | |
| 2007/0292705 A1 | 12/2007 | Moncla et al. | |
| 2008/0075884 A1* | 3/2008 | Hayata | B41M 7/0081 |
| | | | 427/542 |
| 2008/0206478 A1* | 8/2008 | Caiger | C08G 59/68 |
| | | | 522/100 |
| 2008/0227927 A1 | 9/2008 | Schwendeman et al. | |
| 2009/0118388 A1* | 5/2009 | Naruse | C09D 11/101 |
| | | | 522/39 |
| 2010/0129563 A1 | 5/2010 | Herlihy et al. | |
| 2010/0170845 A1 | 7/2010 | Baur | |
| 2012/0125801 A1 | 5/2012 | Kainz et al. | |
| 2012/0129972 A1 | 5/2012 | Hall et al. | |
| 2013/0029057 A1 | 1/2013 | Laksin et al. | |
| 2013/0143039 A1 | 6/2013 | Wilbur et al. | |
| 2014/0039119 A1 | 2/2014 | Hong | |
| 2014/0080967 A1 | 3/2014 | Hayes | |
| 2014/0242346 A1 | 8/2014 | Nielsen et al. | |
| 2014/0251902 A1 | 9/2014 | Solheim et al. | |
| 2015/0101745 A1 | 4/2015 | Ramakrishnan et al. | |
| 2015/0239272 A1 | 8/2015 | Selepack et al. | |

| | | | |
|---|---|---|---|
| 2017/0073540 A1* | 3/2017 | Torrison | C09D 123/0869 |
| 2017/0190927 A1 | 7/2017 | Mao et al. | |
| 2020/0055977 A1 | 2/2020 | Mizuta et al. | |

FOREIGN PATENT DOCUMENTS

| | | | |
|---|---|---|---|
| EP | 1866371 B1 | 12/2007 | |
| JP | S62141046 A | 6/1987 | |
| JP | H05-505644 A | 8/1993 | |
| JP | H09-278897 A | 10/1997 | |
| JP | 2003-529624 A | 10/2003 | |
| JP | 2005-342911 A | 12/2005 | |
| JP | 2010-043186 A | 2/2010 | |
| JP | 2013-500210 A | 1/2013 | |
| JP | 2013-500211 A | 1/2013 | |
| JP | 2013181096 A | 9/2013 | |
| TW | 200940746 A | 10/2009 | |
| WO | WO-1999/063017 A1 | 12/1999 | |
| WO | WO-2006108657 A1 | 10/2006 | |
| WO | WO-2008043812 A2 * | 4/2008 | B32B 37/15 |
| WO | WO-2011/011707 A2 | 1/2011 | |
| WO | WO-2013/079719 A1 | 6/2013 | |
| WO | WO-2014181648 A1 * | 11/2014 | C09D 11/322 |

OTHER PUBLICATIONS

International Search Report and Written Opinion for International Patent Application No. PCT/UC2016/051979, dated Nov. 29, 2016 (11 pages).

* cited by examiner

DOCTOR BLADE ←——— 10
AuNP INK ←——— 11
ANILOX ROLLER ←——— 12
ANILOX FORCE DIRECTION ←——— 13
PRINTING PLATE ←——— 14
PLATE CYLINDER ←——— 15
PLATE CYLINDER FORCE DIRECTION ←——— 16
SUBSTRATE ←——— 17
PRINTING TABLE ←——— 18
PRESSURE ROLLER ←——— 19

Thin film
UV coating
(direct on
aluminum)

Ink or
decorative
coating

Thin film
UV

APPARATUS AND METHODS USING COATINGS FOR METAL APPLICATIONS

CROSS-REFERENCE TO RELATED APPLICATIONS

This application is a continuation of U.S. patent application Ser. No. 16/689,883, filed Nov. 20, 2019, which claims the benefit of and priority to U.S. Provisional Patent Application No. 62/770,006, filed Nov. 20, 2018, the entire contents of each of which are incorporated by reference herein.

FIELD

The present application relates in general to metal coatings, and in particular to an apparatus and methods for using coatings for metal applications.

BACKGROUND

Solvent based coatings are utilized in the metal decorating industry due to a number of properties imparted by their presence, including marring/scuff resistance, adhesion of decorative inks, enhanced formability and improved slip characteristics appropriate for subsequent forming operations. Particularly when forming metal substrates using a drawing process, the high slip characteristics and barrier functionality of an applied coating allows for continuous processing of metal parts without the damaging buildup of metal oxides on the tooling surfaces.

While solvent based coatings have the benefit of being cost effective (<$50/kg) as well as having good mechanical and chemical properties after cure, the curing process releases solvent emissions that can be detrimental to human and environmental health. Environmental regulations pertaining to solvent based coatings in certain localities has promoted the development of "solvent-free" or one hundred percent solids radiation curable formulations.

Radiation curable coatings have the benefit of instantaneous cure under ambient conditions, low/zero emissions, good chemical resistance and high gloss characteristics. While some of the properties of radiation curable coatings are attractive, the preferred crosslink density (acrylates per triglyceride) of greater than two, for these systems, combined with shrinkage upon cure can render the polymer brittle resulting in very poor elongation characteristics.

In order to improve the polymers elongation properties, a monofunctional monomer can be utilized reducing crosslink density. However, along with improved elongation characteristics negative side effects such as increased surface tack, reduced coating toughness, and in some cases a lower glass transition temperature can result.

SUMMARY

An apparatus and methods for using coatings for metal applications are disclosed. According to one embodiment, an article comprises a cured polymeric film having a first reaction product of a cationic photoinitiator and a compound suitable for cationic polymerization. The article has a second reaction product of a free-radical photoinitiator and a compound suitable for free-radical polymerization; The article has a metal substrate, wherein the cured polymeric film coats the metal substrate.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings.

Figure 1:
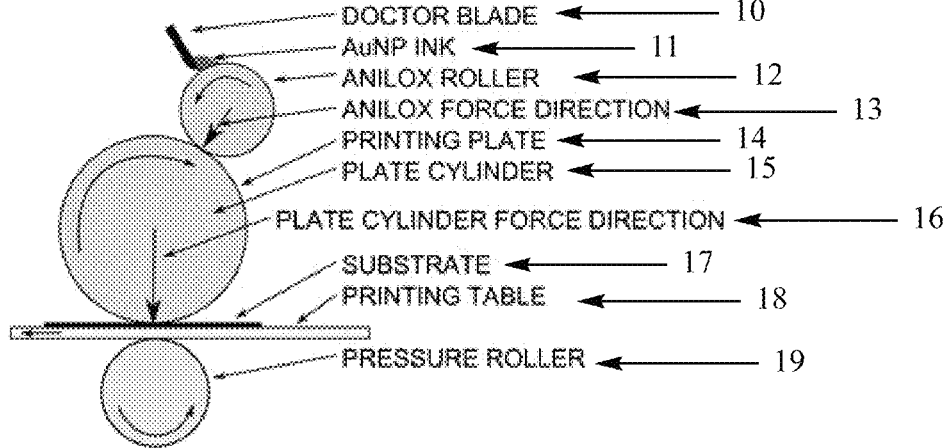
FIG. 1 shows a device used for application of the present coating, a flexographic coater, according to one embodiment.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

DETAILED DESCRIPTION

An apparatus and methods for using coatings for metal applications are disclosed. According to one embodiment, an article comprises a cured polymeric film having a first reaction product of a cationic photoinitiator and a compound suitable for cationic polymerization. The article has a second reaction product of a free-radical photoinitiator and a compound suitable for free-radical polymerization; The article has a metal substrate, wherein the cured polymeric film coats the metal substrate.

The present apparatus and methods provide a radiation curable coating composition consisting of both radical and cationic components having good elongation, good adhesion, a tack level low enough to avoid particulate pickup as well as blocking, good marring resistance, and a glass transition temperature of greater than 40° C.

The present embodiments include applying a functional or functional and decorative coating, or coating/ink combination to metal (e.g., a metal sheet, a metal coil) for deep drawing applications using coating and ink material that contain little to no volatile organic compounds (VOC's). According to one embodiment, the present system and method includes applying a coating, or coating/ink combination to both sides of aluminum sheet metal used for the manufacture of a deep-draw screw-caps for beverage packaging applications. However, the coatings or coating and ink combinations can be applied to any type of metal.

According to another embodiment, the coating system may be loaded with pigment, fillers including silica, bentonite, organoclays or any additive designed for rheology control with the end goal of forming an offset ink using the coating system as a base. This offset ink has the added advantage over other radiation curable systems of being printed direct to metal and maintaining adhesion during forming operations as well as passing a wedge bend test without failure.

The present coating protects metal substrates during the drawing process and could be optionally further decorated after the drawing process.

One embodiment includes an interpenetrating network or semi interpenetrating network of a flexible cycloaliphatic epoxy and a vinyl ether crosslinked with UV radiation. According to another embodiment, the composition contains either one or both radical and cationic photoinitiators. According to another embodiment, the composition contains a polymeric polydimethylsiloxane surface additive.

According to another embodiment, the composition contains a wax as a slip, antiblocking, or anti marring agent. According to another embodiment, the composition contains silica as a rheology additive, antiblocking agent, or the like. According to another embodiment, the composition contains a monofunctional monomer, to reduce the viscosity, increase adhesion, or adjust the glass transition temperature and/or crosslink density of the coating. According to another embodiment, the composition contains a thermoplastic co-binder as an adhesion promoter or enhancer of coating hardness.

The present disclosure describes an environmentally friendly metal coating formulation that is curable by ultra-violet radiation and contains zero volatile organic compounds. FIG. 1 depicts an anilox roller that can be used to apply a coating described herein, e.g., a UV-cured composition described herein, with a film thickness derived from an anilox volume between 2-12 bcm. FIG. 1 shows a device used for application of the present coating, a flexographic coater, according to one embodiment. In printing, anilox is a method used to provide a measured amount of ink to a flexo printing plate. An anilox roll is a hard cylinder, usually constructed of a steel or aluminum core which is coated by an industrial ceramic whose surface contains millions of very fine dimples, known as cells.

The flexographic coater allows for precise film volume, and thereby a thickness, to be applied with the use of an anilox roller 12. The anilox roller 12 has precision cells laser engraved into the ceramic, with the cell density and volume determining the amount of liquid to be transferred. The doctor blade 10 above the anilox roller 12 plays a number of roles including maintaining the coating in the reservoir as well as scraping away excess liquid so that only a metered quantity is applied with each rotation of the roll. The printing plate 14 is utilized on the printing cylinder 15 when designs or spot varnishes need to be applied, with only the raised segments of the plate maintaining contact with the anilox roll 12 and allowing for liquid transfer from the anilox to the plate. The substrate 17 is pushed into direct contact with the printing plate 14 by a pressure roller 19 on the substrate's backside. The force of the pressure roller 19 must be maintained at a level appropriate for the type of substrate, roller durometer, etc. as incorrect roller pressure can cause printing defects including lack of transfer to the substrate or reduced print quality from excessive pressure.

In another embodiment, the film is applied using any number of comparable coating technologies, including roll coating, offset printing, slot die coating, and spray coating, so long as the film weight applied meets the precise performance requirements for the coating. In one embodiment, this coating is applied at a weight of between 0.10-0.90 milligrams per square centimeter—it has been found when cationic or cationic/free radical hybrid photoinitiating systems are utilized, thin films ranging between 0.10-0.90 mg/sq cm can be cured to percent conversions greater than 50% without the negative effect of oxygen inhibition. The added benefit is that film cohesion can be maintained while elongation and adhesion of the film maximized during the drawing process at the film weights described above. It has further been found that above and below the film weight range listed, the coatings fail upon drawing either due to lack of coverage, adhesion failure, or fracturing due to lack of flow. Stress fractures developed during the drawing process can be visualized using a thermal treatment post draw, which will cause defects known as powdering, flaking, or any kind of surface roughness defect to worsen. Defects of this kind will prevent the uniform decoration of these metal substrates post drawing, which will render the articles unsaleable in most industries.

In another embodiment the thin film, zero VOC radiation curable coating can additionally be applied to a solvent based or water based thermoplastic coating as an overprint varnish to protect any ink or coating decorations that have been applied prior to drawing from both mechanical abrasion as well as provide resistance to solvation by a solvent.

Figure 5:
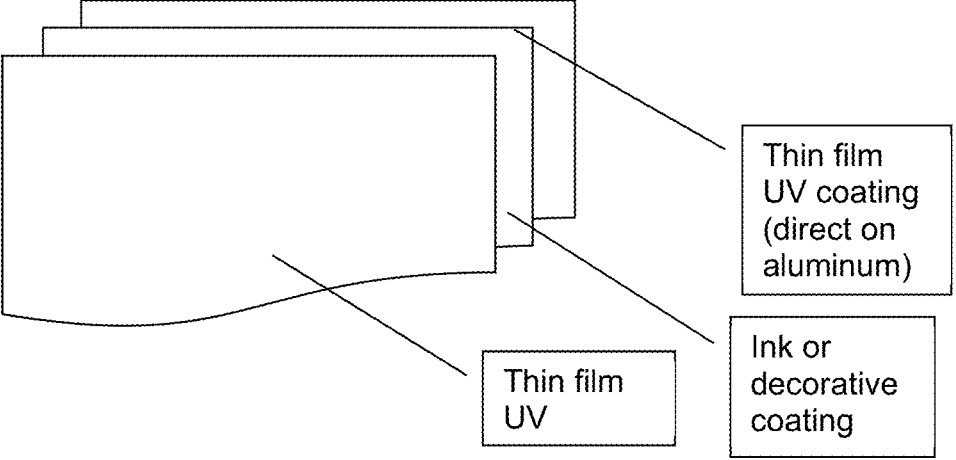
FIG. 5 illustrates an exemplary coating layer build thin film UV curable coating, according to one embodiment.

In another embodiment the thin film, zero VOC radiation curable coating can be applied in multiple layers, the first layer functioning as a size coating or primer, with the ability to adhere to the metal substrate and receive a decorative ink or coating followed by the thin film, zero VOC radiation curable coating composition as an over print varnish. FIG. 5 shows a typical build for this type of system.

In some embodiments, the compositions described herein are substantially free of VOCs. As used herein, the term "substantially free" means less than 5%, alternatively less than 3%, alternatively less than 2%, alternatively less than 1%, alternatively less than 0.5%, alternatively less than 0.25%, alternatively less than 0.1%, alternatively less than 0.05%, alternatively less than 0.01%, alternatively less than 0.001%, and/or alternatively free of. As used herein, "free of" means 0%.

A typical chemical composition for this radiation curable formulation includes at least one flexible cycloaliphatic epoxide crosslinked with a vinyl ether as an interpenetrating network. A preferred embodiment includes 4-hydroxybutyl vinyl ether or triethyleneglycol divinyl ether as the vinyl ether and Bis (3,4-epoxycyclohexylmethyl) adipate as the cycloaliphatic epoxide. Concentrations of between 5 and 30 percent are preferable for the vinyl ether, and that even more preferably concentrations of 10-20 percent may be utilized.

Concentrations between 30 and 60 percent are preferred for the cycloaliphatic epoxide, depending on whether any acrylate functionality is to be utilized with an interpenetrating polymer network (IPN). Acrylate functionality can be introduced into the IPN in the form of high elongation urethane acrylates like Sartomer CN9071 and CN966J75, as well as in the form of isobornyl acrylate. Both can be utilized to increase elongation of the film as well as increase the film weight, with curing energy levels of greater than 200 mJ/cm². Caprolactone or polycarbonate diols like Capa 2050, Placcel 205U, Placcel 220N, Placcel 220 EC, or CD220PL can also enhance elongation, flexibility, and impact resistance of the film. When utilized at levels below 25 percent, these components improve certain properties of the IPN due to their ability to act as a chain transfer agent, and in particular polycarbonate diols can be used to dramatically improve solvent resistance.

In yet another embodiment, the IPN can be initially cured using UV Radiation to form a film that behaves similar to a thermoplastic coating due to its average crosslink density of less than two, exceptional adhesion to aluminum, and moderate hardness.

A dual cure approach with a latent thermal cure initiator can further improve solvent resistance. One embodiment for this application is a blocked isocyanate, as these compounds show good pot lives, good reactivity with hydroxyl compounds, and good solvent resistance after cure.

During forming operations (e.g., deep draw operations) the coating can be utilized in a low crosslink density state where the properties are adequate for protection of the aluminum substrate and the film retains enough cohesion to be drawn at exceptionally high degrees (e.g., greater than 300%). Once the forming step is complete, the film can be thermally cured to achieve its final properties. Solvent resistance of greater than 25 acetone rubs and in some cases greater than 50 rubs can be achieved with 10 minutes of post thermal curing at 180 degrees Celsius. Alternatively a phenolic type crosslinker can be used in a similar fashion to achieve the same final properties after thermal cure of the coating.

Photoinitiators for the radiation curable formulation include both cationic and free radical initiators used in conjunction. According to one embodiment, a combination includes a sulfonium salt based cationic initiator like Omnicat 320 (triaryl sulfonium salt in propylene carbonate) alongside an alpha hydroxy ketone like Omnirad 1173 (2-hydroxy-2-methyl-1-phenyl-propan-1-one) or alternatively a low migration alpha hydroxy ketone like Esacure one.

Additives can provide important enhancements to the thin film, radiation curable IPN's chemical and mechanical properties including adhesion promotion, intercoat adhesion, surface slip, marring resistance, and hardness. A typical additive for promotion of adhesion and improvement of film hardness is a thermoplastic co-binder like Addbond LTH or Variplus 3350 UV. Modification of surface slip and blocking resistance can also be achieved using additives like waxes or polymeric silicones. A typical additive for improvement of these properties is BYK UV 3500 or Microklear 295—a micronized polyethylene carnauba wax blend.

According to one embodiment, metal is coated with a low VOC (less than 5% by solids weight) UV curable coating with elongation properties greater than 300%, hardness of greater than 8H pencil hardness, and complete abrasion resistance when subjected to 500 rubs with a Sutherland Rub tester. This coating is applied at with a film thickness derived from an anilox volume between 2-12 bcm as laid down by an anilox roller, such as the roller 12 illustrated in FIG. 1. Depending on the design of the printing press, the anilox roll is either semi-submerged in the ink fountain, or comes into contact with a metering roller, which is semi-submerged in the ink fountain. In either instance, a thick layer of typically viscous ink is deposited on the roller. A doctor blade is used to scrape excess ink from the surface leaving just the measured amount of ink in the cells. The roll then rotates to contact with the flexographic printing plate which receives the ink from the cells for transfer to the printed material.

According to one embodiment, there is between 10-30% hydroxyl functional monomers and/or caprolactones. These hydroxy functional groups can be further crosslinked using a thermally cured blocked isocyanate.

Curing stages may be performed in a stepwise manner, with the UV cure being completed prior to forming operations and the latent thermal cure being carried out post forming.

Figure 2:
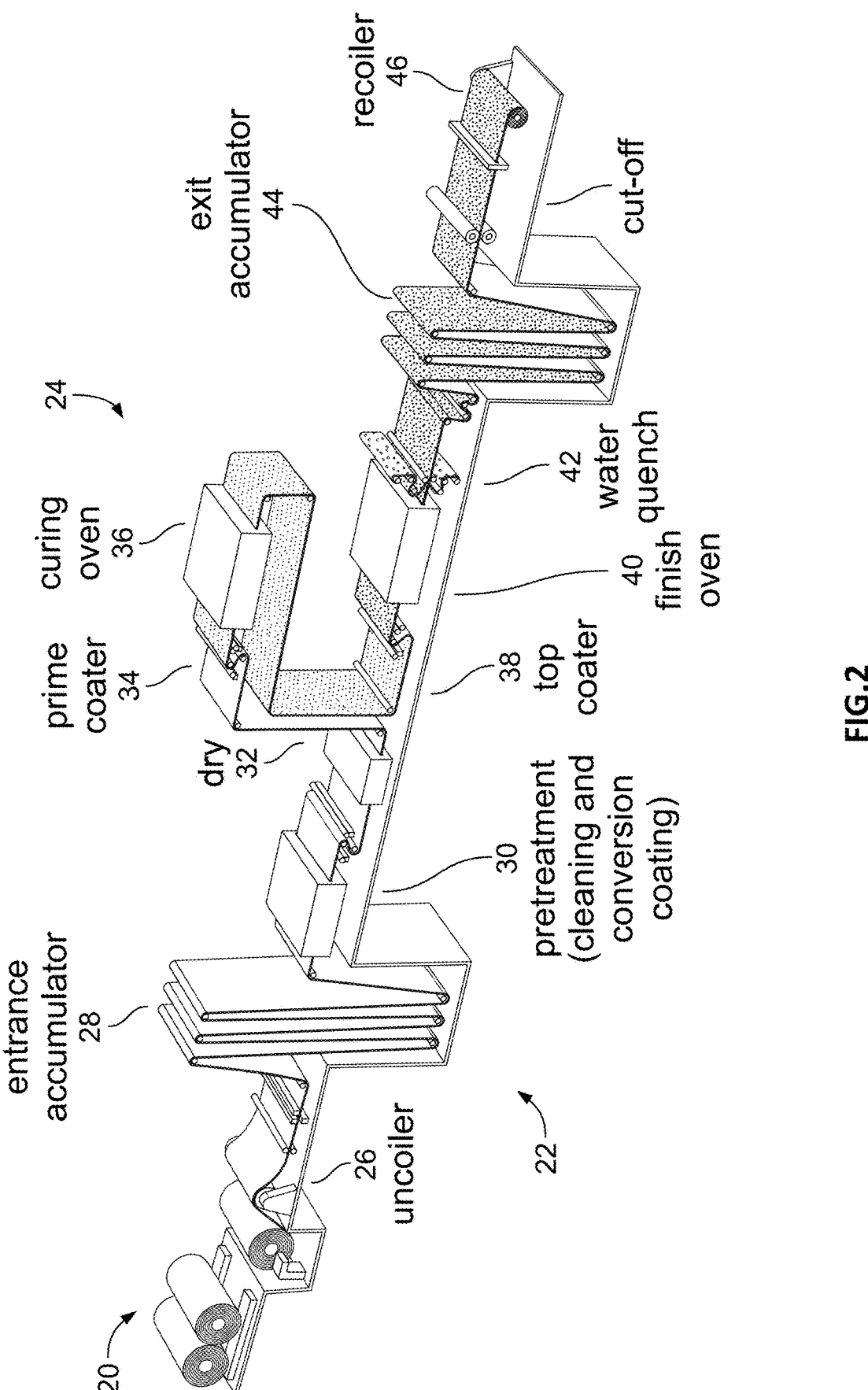
FIG. 2 illustrates an exemplary system for applying a coating to coiled metal, according to one embodiment.

A coating is applied to a metal substrate using a coil or a flat sheet coater. FIG. 2 illustrates an exemplary system for applying a coating described herein, e.g., a UV-cured composition, to a metal substrate 20 that is staged in coil form at the feed to the coil coater process 24, according to one embodiment. The metal substrate 20 is staged in coil form at the feed to the coil coater process 24. The metal substrate 20 is unwound at an uncoiler 26 and passed to an entrance accumulator 28 to ensure consistent feed into the coating process train. The uncoiled metal substrate 20 is then passed to a pre-treatment station 30, where the metal's surface is cleaned, possibly treated to increase its surface energy, and possibly coated with a tie-coating, such as a size or base coat. If the metal was coated with a tie-coating, it is then dried at a drying station 32 before being sent to the coil coater 24. The coil coater 24 includes a prime coater station 34 that applies the main color or functional coating to the metal substrate. The color or functional coating on the metal substrate is then cured in a curing oven 36. Next, at a top coat station 38 of the coil coater 24, a top coat such as a protective over-varnish is applied to the metal substrate, and is cured in a finish oven 40. The substrate then might enter a water quench station 42 to quickly cool the coated metal, before entering an exit accumulator 44 that allows for continually re-coiling the coated metal at the proper tension and rewind speed.

Figure 3:
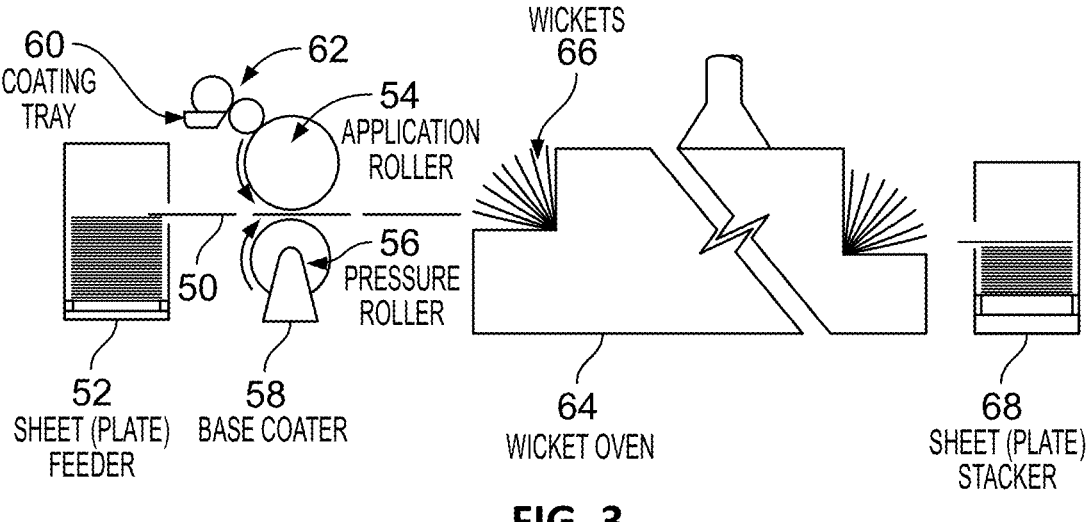
FIG. 3 illustrates an exemplary system for applying a coating to a metal sheet, according to one embodiment.

The coating processes may apply multiple coating layers onto one or both sides of the metal substrate in one or multiple passes. FIG. 3 illustrates an exemplary system for applying a coating described herein, e.g., a UV-cured composition, to a metal sheet 50 in which metal sheets 50 may be stored in a sheet or plate feeder 52, according to one embodiment. As shown in FIG. 3, metal sheets 50 may be stored in a sheet or plate feeder 52. From the sheet feeder 52, each metal sheet 50 is fed to a conveyor (not shown). The sheets may be treated to clean and increase their surface energy (not shown) prior to coating application at the application roller 54. During the coating application, the sheet is supported underneath by a pressure roller 56. As shown in FIG. 3, the conveyor transfers the metal sheet to a base coater 58 operation, where the metal sheet 50 is fed between the application roller 54 and the pressure roller 56. A coating tray 60 transfers coating material to the application roller 54 using a series of rollers 62, and the application roller applies the coating to each metal sheet as it passes. After the coating material is applied at the base coater 58, the metal sheet 50 is sent into a wicket oven 64 that includes wickets 66 that hold and convey individual metal sheets through the oven at a specified rate. The coated metal sheets are heated, dried, and cooled in the wicket oven 64 at specified temperatures and are then transferred to a sheet or plate stacker 68.

A coating is a liquid that may contain, but is not limited to, binders, pigments, dyes, or waxes applied to the interior and/or exterior of a substrate (e.g., aluminum metal) for decorative, functional, or decorative and functional purposes. The coating may be applied using techniques to completely cover the substrate, or it may be applied to specifically cover selective parts of the substrate. These include tie-layer coatings, including clear and base—relatively low pigment containing—coatings, applied to assist adhesion of subsequent coatings to the metal, color coatings for decorative purposes and over-varnish coatings to protect the color coats and printed artwork.

Coatings that are applied to the interior and exterior surfaces of a metal packaging component may have different functions depending on the application of the component. For example, an interior coating on a metal packaging component directly contacting the food product protects the metal from corrosion by the food contents and protects the food from metal contamination. Interior coatings may also contain agents to aid in the functionality of the finished products. For example, slip agents, such as waxes, may be used in the case of screw cap closures to reduce the torque required to remove the cap from a bottle. Exterior coatings are applied for decoration, to protect the package or packaging component against corrosion, and to protect the printed design from marring or abrasion.

Figure 4A:
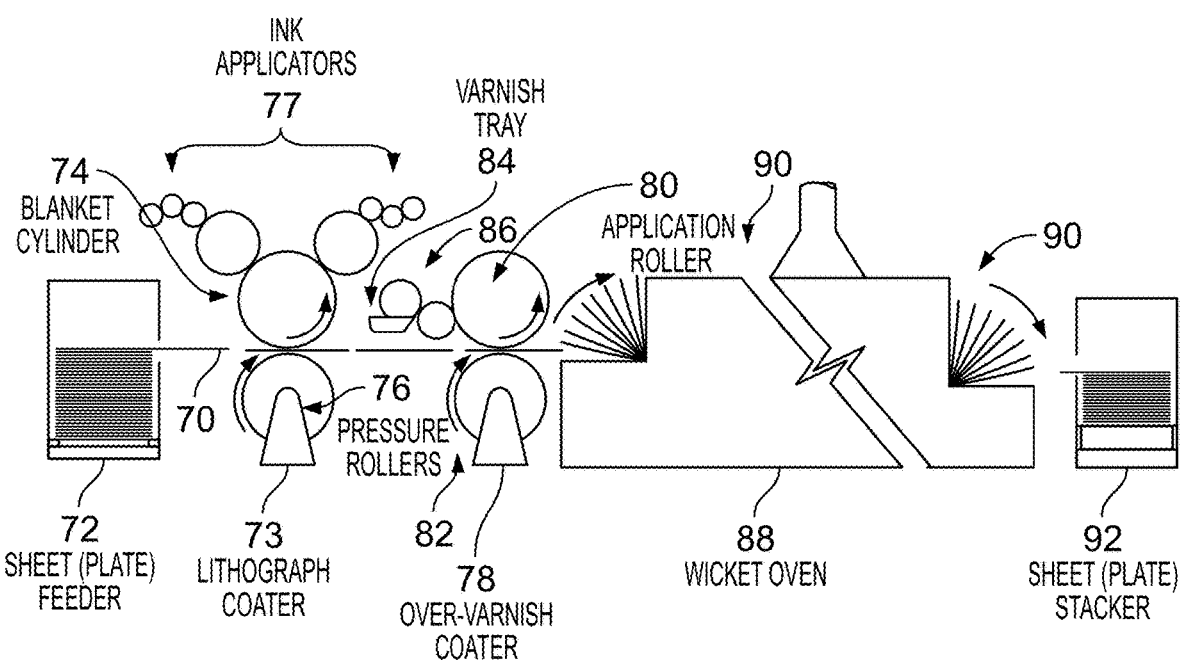
FIGS. 4A and 4B illustrate exemplary systems for applying inks to a metal sheet, according to various embodiments.
Figure 4B:
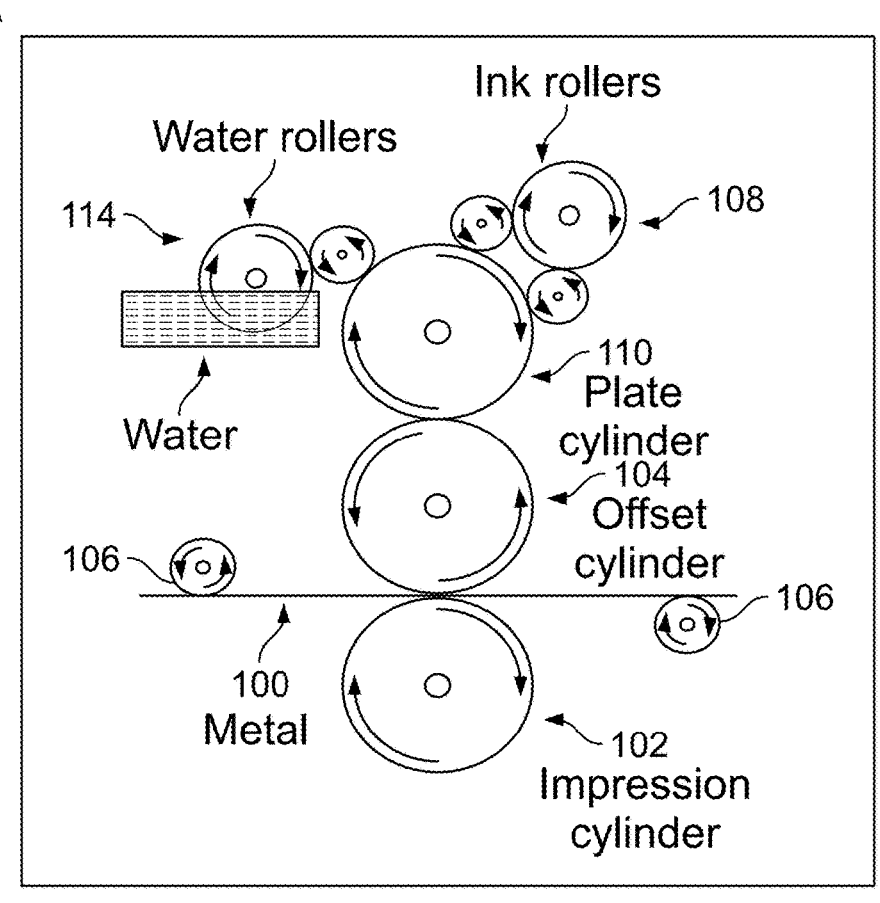

Ink is applied to a flat metal sheet either in direct contact with the metal or over a coating previously applied to the metal using a sheet-fed offset lithography printer. FIGS. 4A and 4B illustrate exemplary systems for applying inks to a metal sheet using a sheet-fed offset lithography printer. FIG. 4A depicts a system in which metal sheets 70 may be stored in a sheet or plate feeder 72. FIG. 4B depicts a system in which metal sheets 100 are fed into an offset printing assembly between an impression cylinder 102 on one side and an offset cylinder 104 on the opposite side of the metal sheet 100.

In one embodiment, offset printing consists of an inked image being transferred from a plate to a blanket and then transferred to the metal's printing surface. These systems may be used with a lithographic process, employing a hydrophobic ink, including ultraviolet curable inks, and water-based fountain solution applied to an image carrier. The ink is applied to the image carrier via rollers along with a fountain solution. The non-printing area of the image carrier attracts the fountain solution that repels the ink keeping the non-printing areas ink-free. Inks may be applied to the surface of cured coatings to add solid color or decorative elements to the metal. These inks can then be cured and protected by over-coating with a clear over-varnish coating.

As shown in FIG. 4A, metal sheets 70 may be stored in a sheet or plate feeder 72. From the sheet feeder 72, each metal sheet 70 is fed to a conveyor (not shown) and then to a lithograph coater 73. There may be a blanket cylinder 74 on one side of the conveyor and a pressure roller 76 on the opposite side of the conveyor at the lithograph coater 73. Ink applicators 77 transfer ink through a series of rollers to the blanket cylinder 74. As shown in FIG. 4A, the conveyor transfers the metal sheet to the lithograph coater 73, where the metal sheet 70 moves between the blanket cylinder 74 and the pressure roller 76, and the blanket cylinder 74 applies the coating to each metal sheet as it passes by on the conveyor. After receiving the inked image at the lithograph coater 73, the metal sheet 50 may be sent to an over-varnish coater 78 that includes an application roller 80 and a pressure roller 82 on opposite sides of the conveyor. A varnish tray 84 storing over-varnish is applied to the application roller 80 through a series of rollers 86, and the over-varnish is then applied to the metal sheets by way of the application roller 80. After receiving varnish, the coated metal sheets are then sent to a wicket oven 88 that includes wickets 90 that that hold individual metal sheets. The coated metal sheets are dried in the wicket oven 88 and then transferred to a sheet or plate stacker 92.

As shown in the embodiment of FIG. 4B, metal sheets 100 are fed into an offset printing assembly between an impression cylinder 102 on one side and an offset cylinder 104 on the opposite side of the metal sheet 100. Additional rollers 106 may also be used to help feed the metal sheet through the printing assembly. Ink applicators 108 transfer ink through a series of rollers to a plate cylinder 110 as shown in FIG. 4B. A water tray 112 storing water (or composition including water) is applied to the plate cylinder 110 through a series of rollers 114. From the plate cylinder 110, the ink is transferred to the offset cylinder 104. When the metal sheet 100 is between the impression cylinder 102 and the offset cylinder 104, the offset cylinder 104 applies the ink coating to the metal sheet 100 as it passes through the offset printing assembly. As with the above embodiment described in FIG. 4A, the metal sheet including the inked image may be sent to an over-varnish coater, and may then be sent to an oven for curing.

FIG. 5 illustrates an exemplary coating layer build thin film UV curable coating, in which a thin film UV coating is applied directly on aluminum, followed by an ink or decorative coating and another thin film UV coating, according to one embodiment. A thin film UV coating is applied directly on aluminum, followed by an ink or decorative coating and another thin film UV coating.

Additional embodiments as contemplated herein include the following:

In an embodiment, described herein is an article, comprising: a cured polymeric film having a first reaction product of a cationic photoinitiator and a compound suitable for cationic polymerization, and a second reaction product of a free-radical photoinitiator and a compound suitable for free-radical polymerization; and a metal substrate, wherein the cured polymeric film coats the metal substrate.

In some embodiments, the cured polymeric film is substantially free of a volatile organic compound. In some embodiments, the cured polymeric film has an average thickness derived from an anilox volume between 2-12 bcm. In some embodiments, the compound suitable for cationic polymerization is a multifunctional epoxide. In some embodiments, the multifunctional epoxide is a cycloaliphatic epoxide. In some embodiments, the cycloaliphatic epoxide is bis (3,4-epoxycyclohexylmethyl) adipate. In some embodiments, the cycloaliphatic epoxide is incorporated into the first reaction product in an amount from 30% to 60% by weight based on the total weight of the polymeric film. In some embodiments, the compound suitable for free-radical polymerization is a vinyl ether. In some embodiments, the vinyl ether is incorporated into the second reaction product in an amount from 5 percent to 30 percent by weight based on the total weight of the polymeric film. In some embodiments, the vinyl ether is selected from 4-hydroxybutyl vinyl ether and triethyleneglycol divinyl ether. In some embodiments, the polymeric film comprises an interpenetrating network or semi-interpenetrating network. In some embodiments, the first reaction product and second reaction product are crosslinked. In some embodiments, the polymeric film further comprises a third reaction product comprising a free-radical photoinitiator and a second compound suitable for free-radical polymerization, and optionally an oligomer. In some embodiments, the second compound suitable for free-radical polymerization is isobornyl acrylate or ethoxylated (9) trimethylol propane triacrylate and optionally the oligomer is selected from the group consisting of Sartomer CN9071 and CN966J75. In some embodiments, the polymeric film further comprises a fourth reaction product of a cationic photoinitiator, a compound suitable for cationic polymerization, and a polycarbonate diol or caprolactone diol. In some embodiments, the caprolactone diol or polycarbonate diol is incorporated into the fourth reaction product in an amount less than 25 percent by weight based on the total weight of the polymeric film. In some embodiments, the article is in the form of a sheet. In some embodiments, the article is in the form of a coil. In some embodiments, the article is in the form of a screw-cap. In some embodiments, the article further comprises an ink coated on the surface of the metal or polymeric film. In some embodiments, the ink comprises one or more components selected from the group consisting of a pigment, a filler such as bentonite, organoclays, and other additives designed for rheology control. In some embodiments, the ink directly contacts the metal. In some embodiments, the ink contacts the polymeric film and does not contact the metal. In some embodiments, the ink is coated by the polymeric film. In some embodiments, the ink is coated by an over-varnish. In some embodiments, the cured polymeric film has an elongation of greater than 300%. In some embodiments, the cured polymeric film has a solvent resistance of greater than 25 solvent rubs or greater than 50 solvent rubs. In some embodiments, the cured polymeric film has complete scuff and mar resistance when subjected to 500 rubs.

In one embodiment, described herein is a method, comprising: curing a composition having a cationic photoinitiator and a monomer, a free-radical photoinitiator, a monomer and/or oligomer suitable for free-radical polymerization with ultraviolet radiation forming a UV-cured composition; curing with a thermal cure initiator onto a metal substrate; and thermally activating the thermal cure initiator in the UV-cured composition to finalize the forming of the polymeric film. In some embodiments, the method further comprises subjecting the article to deep drawing. In some embodiments, the method further comprises decorating the polymeric film with an ink. In some embodiments, the thermal curing agent is a blocked isocyanate.

In an embodiment, also described herein is a method, comprising: curing an ink composition having a cationic photoinitiator and a monomer, and a free-radical photoinitiator and a monomer and/or oligomer suitable for free-radical polymerization with ultraviolet radiation forming a UV-cured composition; curing with a thermal cure initiator onto a metal substrate forming an ink-printed metal substrate; coating the ink-printed metal substrate with the UV-cured composition; and thermally activating the thermal cure initiator in the UV-cured composition to form the polymeric film. In some embodiments, the thermal curing agent is a blocked isocyanate. In some embodiments, the method further comprises subjecting the article to deep drawing. In some embodiments, the method further comprises printing the polymeric film coated metal with an ink.

OTHER EMBODIMENTS

In the claims articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or all of the group members are present in, employed in, or otherwise relevant to a given product or process.

Furthermore, the invention encompasses all variations, combinations, and permutations in which one or more limitations, elements, clauses, and descriptive terms from one or more of the listed claims is introduced into another claim. For example, any claim that is dependent on another claim can be modified to include one or more limitations found in any other claim that is dependent on the same base claim. Where elements are presented as lists, e.g., in Markush group format, each subgroup of the elements is also disclosed, and any element(s) can be removed from the group. It should it be understood that, in general, where the invention, or aspects of the invention, is/are referred to as comprising particular elements and/or features, certain embodiments of the invention or aspects of the invention consist, or consist essentially of, such elements and/or features. For purposes of simplicity, those embodiments have not been specifically set forth in haec verba herein. It is also noted that the terms "comprising" and "containing" are intended to be open and permits the inclusion of additional elements or steps. Where ranges are given, endpoints are included. Furthermore, unless otherwise indicated or otherwise evident from the context and understanding of one of ordinary skill in the art, values that are expressed as ranges can assume any specific value or sub-range within the stated ranges in different embodiments of the invention, to the tenth of the unit of the lower limit of the range, unless the context clearly dictates otherwise.

This application refers to various issued patents, published patent applications, journal articles, and other publications, all of which are incorporated herein by reference. If there is a conflict between any of the incorporated references and the instant specification, the specification shall control. In addition, any particular embodiment of the present invention that falls within the prior art may be explicitly excluded from any one or more of the claims. Because such embodiments are deemed to be known to one of ordinary skill in the art, they may be excluded even if the exclusion is not set forth explicitly herein. Any particular embodiment of the invention can be excluded from any claim, for any reason, whether or not related to the existence of prior art.

Those skilled in the art will recognize or be able to ascertain using no more than routine experimentation many equivalents to the specific embodiments described herein. The scope of the present embodiments described herein is not intended to be limited to the above Description, but rather is as set forth in the appended claims. Those of ordinary skill in the art will appreciate that various changes and modifications to this description may be made without departing from the spirit or scope of the present invention, as defined in the following claims.

What is claimed is:

1. A method comprising:
    obtaining a metal substrate coated with a polymeric film comprising:
       a first polymer comprising a reaction product of a cationic photoinitiator and (3,4-epoxycyclohexylmethyl) adipate; and
       a second polymer comprising a reaction product of a free-radical photoinitiator and a vinyl ether selected from 4-hydroxybutyl vinyl ether and triethyleneglycol divinyl ether; and
       a third polymer comprising a reaction product of a hydroxyl functional monomer and a thermal curing agent;

deep drawing the metal substrate and the polymeric film while the polymeric film is in a first crosslink density state; and curing the deep-drawn polymeric film to achieve a second crosslink density state.

2. The method of claim 1, wherein the first polymer is present in the polymeric film in an amount from 30% to 60% by weight, based on a total weight of the polymeric film.

3. The method of claim 1, wherein the second polymer is present in the polymeric film in an amount from 5 percent to 30 percent by weight, based on a total weight of the polymeric film.

4. The method of claim 1, wherein the first polymer and the second polymer form an interpenetrating network or a semi-interpenetrating network.

5. The method of claim 1, wherein the first polymer and the second polymer are crosslinked.

6. The method of claim 1, wherein the polymeric film further comprises a fourth polymer obtained using a free-radical photoinitiator and at least one of isobornyl acrylate or ethoxylated (9) trimethylol propane triacrylate.

7. The method of claim 1, wherein the polymeric film further comprises a fourth polymer obtained using a cationic photoinitiator and at least one of a polycarbonate diol or a caprolactone diol.

8. The method of claim 7, wherein the fourth polymer is present in the polymeric film in an amount less than 25 percent by weight, based on a total weight of the polymeric film.

9. The method of claim 1, wherein obtaining the metal substrate coated with the polymeric film comprises:

coating the metal substrate with a curable film; and curing the curable film with ultraviolet radiation to obtain the polymeric film.

10. The method of claim 1, wherein deep drawing the metal substrate and the polymeric film comprises achieving an elongation of greater than 300%.

11. The method of claim 1, wherein deep drawing the metal substrate and the polymeric film comprises forming a screw-cap.

12. The method of claim 1, further comprising applying an ink over the metal substrate.

13. The method of claim 12, wherein the ink is coated by the polymeric film or an over-varnish.

14. The method of claim 1, wherein curing the deep-drawn polymeric film comprises using a blocked isocyanate as a thermal curing agent.

15. The method of claim 1, wherein curing the deep-drawn polymeric film comprises using a phenolic cross-linker.

\* \* \* \* \*